United States Patent

Shida et al.

[11] Patent Number: 6,014,406
[45] Date of Patent: Jan. 11, 2000

[54] FREQUENCY-HOPPED WIRELESS COMMUNICATION SYSTEM AND MOBILE WIRELESS TERMINAL

[75] Inventors: Masaaki Shida, Kokubunji; Tomoaki Ishifuji, Tokyo; Masato Hirai, Hadano; Hidehiko Jusa, Kawasaki; Takaharu Aoyama, Atsugi; Kenichiro Orita, Hadano, all of Japan

[73] Assignees: Hitachi, Ltd., Tokyo; Hitachi Computer Engineering Co., Ltd., Hadano, both of Japan

[21] Appl. No.: 08/637,175

[22] Filed: Apr. 24, 1996

[30] Foreign Application Priority Data

Apr. 26, 1995 [JP] Japan .................................... 7-101923
Apr. 28, 1995 [JP] Japan .................................... 7-105278

[51] Int. Cl.$^7$ ............................. H04B 15/00; H04K 1/00; H04L 27/30
[52] U.S. Cl. ......................... 375/202; 375/356; 375/364; 455/552; 370/221; 370/312; 370/328
[58] Field of Search ..................................... 375/259, 356, 375/364, 200, 202; 455/423, 424, 425, 575, 9, 11.1, 552; 370/216, 221, 222, 310, 312, 315, 320, 328, 335, 342

[56] References Cited

U.S. PATENT DOCUMENTS 4,397,018  8/1983  Fennel, Jr. et al. ..................... 370/226
5,117,421  5/1992  Tokizane et al. ........................ 370/221
5,260,988  11/1993 Schellinger et al. ..................... 455/552
5,537,434  7/1996  Persson et al. ........................... 375/202
5,590,174  12/1996 Tsuji et al. ............................... 455/553
5,619,553  4/1997  Young et al. ............................... 379/61

OTHER PUBLICATIONS

Illustrated Standard LAN Text (vol. 2), by Seiji Uehara, published by ASCII Publication. pp. 63–96.
IEEE 802.11 Working Documents, IEEE 802, 11/92–39, Medium Access Control Protocol for Wireless LANs.
Nikkei Communications No. 167, Feb. 7, 1994, pp. 86–100.

Primary Examiner—Chi H. Pham
Assistant Examiner—Bryan Webster
Attorney, Agent, or Firm—Antonelli, Terry, Stout & Kraus, LLP

[57] ABSTRACT

A frequency-hopped mobile communication system is disclosed, in which a mobile wireless station automatically becomes a base station in accordance with the surrounding conditions, thereby automatically reconfiguring a communication network. A control frame is generated by at least one master station, and frequencies are hopped by a plurality of slave stations in accordance with the control frame. Each slave station switches the master thereof to be tracked, in accordance with the receiving conditions of the control frame and the relation between the control frame received from the master station and the status of the slave station and decides in which mode, master station or slave station, the slave station is to operate. The cells are thus automatically reconfigured.

27 Claims, 12 Drawing Sheets

FIG.3
|  |  | 0 | 1 | 2 | 3 | 4 | 5 | 6 | 7 | 8 | 9 | 10 | 11 | 12 |  |
|---|---|---|---|---|---|---|---|---|---|---|---|---|---|---|---|
| MST | #1 | f0 | f11 | f7 | f12 | f9 | f3 | f4 | f6 | f10 | f5 | f8 | f1 | - | 11a |
|  | #2 | f0 | f10 | f4 | f5 | f7 | f11 | f6 | f9 | f2 | f1 | f12 | f8 | - | 11b |
|  | #3 | f0 | f9 | f1 | f11 | f5 | f6 | f8 | f12 | f7 | f10 | f3 | f2 | - | 11c |
|  | #4 | f0 | f8 | f11 | f4 | f3 | f1 | f10 | f2 | f12 | f6 | f7 | f9 | - | 11d |
|  | #5 | f0 | f7 | f8 | f10 | f1 | f9 | f12 | f5 | f4 | f2 | f11 | f3 | - | 11e |
| BST | #1 | f0 | f6 | f12 | f5 | f11 | f4 | f10 | f3 | f9 | f2 | f8 | f1 | f7 | 11f |
|  | #2 | f12 | f5 | f11 | f4 | f10 | f3 | f9 | f2 | f8 | f1 | f7 | f0 | f6 | 11g |
|  | #3 | f10 | f3 | f9 | f2 | f8 | f1 | f7 | f0 | f6 | f12 | f5 | f11 | f4 | 11h |
|  | #4 | f1 | f7 | f0 | f6 | f12 | f5 | f11 | f4 | f10 | f3 | f9 | f2 | f8 | 11i |
|  | #5 | f11 | f4 | f10 | f3 | f9 | f2 | f8 | f1 | f7 | f0 | f6 | f12 | f5 | 11j |
FIG.4
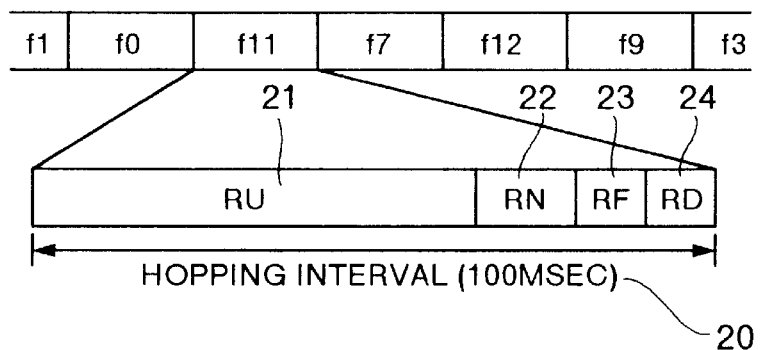
FIG.5
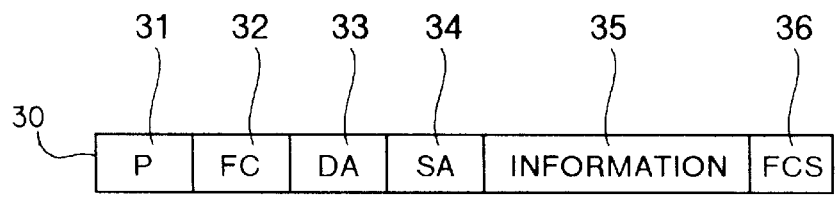

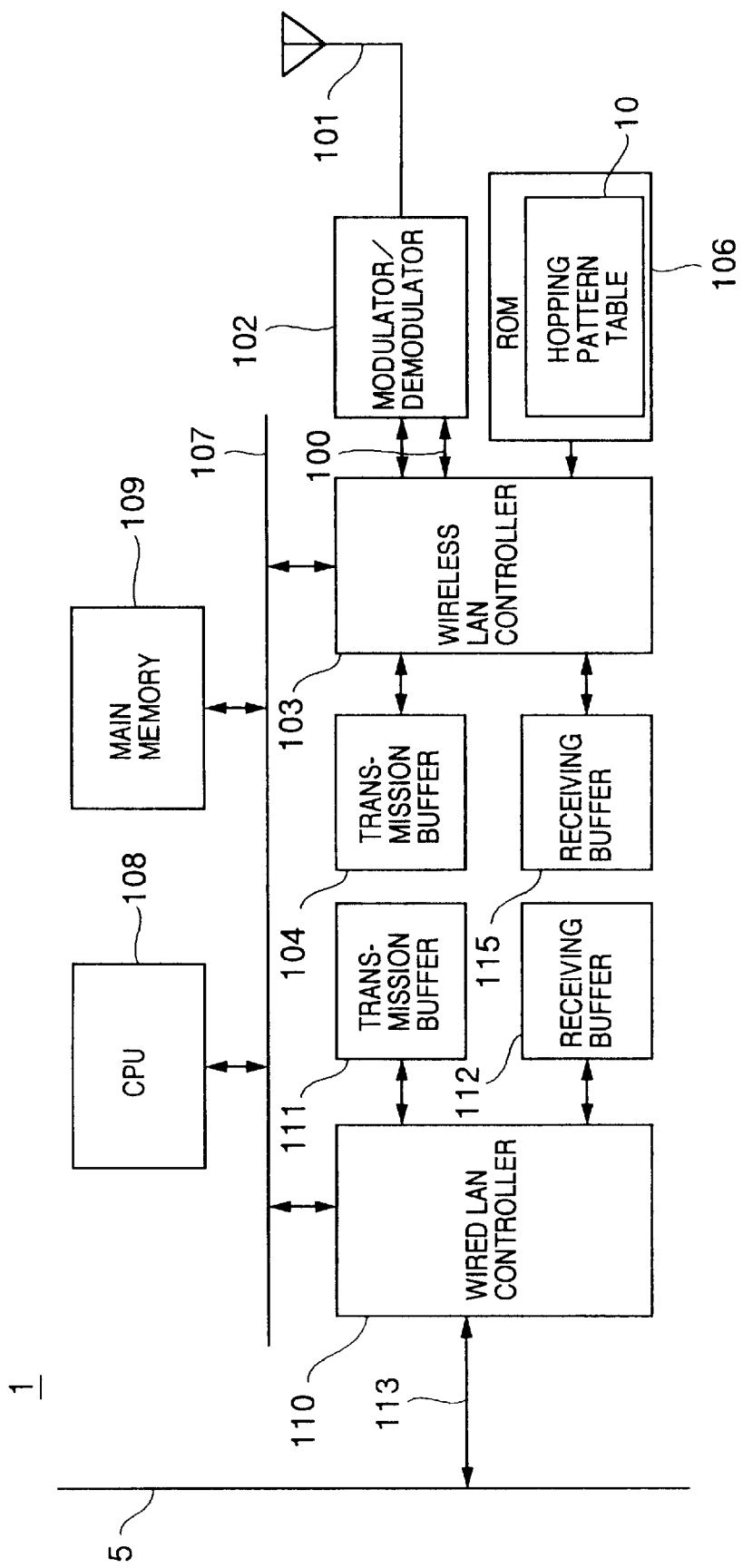

FREQUENCY-HOPPED WIRELESS COMMUNICATION SYSTEM AND MOBILE WIRELESS TERMINAL

BACKGROUND OF THE INVENTION

1. Field of the Invention

The present invention relates to a wireless communication system, or more in particular to a frequency-hopped wireless communication system comprising a plurality of wireless communication equipment for performing mutual communication while hopping transmission and receiving frequencies in synchronism with a base station, and a mobile wireless terminal.

2. Description of the Related Art

The conventional mutual communication systems comprising a plurality of wireless communication equipments for performing communication with each other are classified into three types including peer decentralization, centralization and hybrid, as seen in the wireless LAN system described in "Illustrated Standard LAN Text (Vol. 2)", pp. 63–96 (Reference 1), by Seiji Uehara, published by ASCII Publication, for example. The "peer decentralization" is the type in which all wireless communication equipments communicate information and perform control operation on a peer-to-peer basis. The centralization type is one in which the control operation is performed by wireless communication equipment called the base station, and the other wireless communication equipments communicate only with the base station. The "hybrid" is a type of communication in which the control operation is performed by the base station and information is transmitted on a peer-to-peer basis by all of the wireless communication equipment including the base station.

Communication systems include one called the "frequency hopped system" for performing the communication while periodically changing the transmission/receiving frequencies (carrier frequency) as a communication system belonging to the centralization or hybrid type. This type of system requires a base station for applying a timing of frequency hopping, as described in IEEE 802.11 Working Documents, IEEE 802, 11/92-39, "Medium Access Control Protocol for Wireless LANs" (Reference 2), for example.

Also, NIKKEI Communications No.167, Feb. 7, 1994, pp.86–100 (Reference 3) discloses a well known wireless LAN system capable of using a plurality of base stations at the same time, wherein wireless communication equipment under the control of a base station has the function of automatically seeking another base station when the first base station loses the wireless communication capability due to a fault or the like.

A communication system requiring a base station like the centralization or hybrid type described in Reference 1 requires a base station or setting of a wireless communication equipment operating as a base station before the system is configured. A communication system requiring a base station, on the other hand, poses the problem of the system function being incapable of being maintained in the absence of an alternate base station when the base station becomes incapable of communication due to a fault or the like.

SUMMARY OF THE INVENTION

An object of the present invention is to provide a wireless communication system and a mobile wireless terminal arranged such that wireless communication equipment functioning as a base station (or a master station) is determined automatically from among a plurality of wireless communication equipment constituting the communication system in accordance with the prevailing situation and therefore the user or the system manager is not required to set a base station in advance.

Determining one out a plurality of wireless communication equipment requires that predetermined control information be transmitted and received between these wireless communication equipment. With a mobile wireless communication system having an unstable communication path, however, it is impossible to secure a path connecting a plurality of wireless communication equipment for selecting a base station covering the whole system. For this reason, a plurality of wireless communication equipment may be selected as base stations, and the control area may be divided for each base station. In such a situation, with the condition change of a communication path or the movement of wireless communication equipment, communication may become possible between the wireless communication equipment which have thus far been unable to communicate with each other. When particular wireless communication equipment receives a control frame from a plurality of base stations, therefore, the control operation may be confused as to which station should be used as a master station for each slave station.

Another object of the invention is to provide a wireless communication system and a mobile wireless terminal having a function to automatically converge into one base station when plurality of base stations are present in the same communication area.

Still another object of the invention is to provide a wireless communication system and a mobile wireless terminal in which an equipment desirable for the communication system is finally selected as a base station in the process of converging a plurality of base stations into one base station.

A further object of the invention is to provide a mobile wireless terminal capable of performing communication in synchronism with selected one of a plurality of base stations from which a control frame may be received.

A still further object of the invention is to provide a wireless communication system and a mobile wireless terminal suitable for the frequency-hopped communication, in which the mobile wireless terminal is capable of selectively receiving the frequency-hopping control frame transmitted from a base station and thus avoiding switching the base station erroneously.

In order to achieve the above-mentioned objects, a wireless communication system according to the present invention comprises a plurality of mobile wireless terminals and at least one stationary base station connected to a network for periodically generating a frequency hopping control frame (hereinafter referred to as "the FH control frame") and performing the communication operation by switching the transmission/receiving frequencies in accordance with a predetermined hopping pattern, each of said mobile wireless terminals having two operation modes including a base station mode (or master station mode) for performing the communication operation by generating FH control frames periodically and switching the transmission/receiving frequencies in accordance with a predetermined hopping pattern, and a slave station mode for performing the communication operation by switching the transmission/ receiving frequencies in accordance with a predetermined hopping pattern in synchronism with the FH control frame generated by a base station. Each of the mobile wireless terminals includes means for detecting whether there is communication equipment operating in base station mode within the wireless communication area, and performs the communication operation by selecting the slave station mode or the base station mode as its operation mode in accordance with the result of detection by the detection means.

The presence or absence of a base station is detected, for example, by checking whether a FH control frame is received or not within a predetermined time period.

According to one aspect of the invention, there is provided a wireless communication system in which the frequency period (hop interval) required for a given transmission/receiving frequency to change to another frequency is about 100 ms, for example. In practice, this hop interval is divided into first to fourth periods, for example. The stationary base station and each mobile wireless terminal are caused to transmit a communication frame including user information during the first period, to suppress the transmission of the communication frame during the second period, to transmit a FH control frame during the third period, and to hop frequencies during the fourth period.

According to another aspect of the invention, there is provided a mobile wireless terminal comprising means for storing a station status ID representing the relation between the mobile wireless terminal and a base station, and means for selecting, as an operation mode thereof one of the base station mode and the slave station mode in accordance with the relation between the station status ID of the mobile wireless terminal and a base station transmitting the FH control frames.

More specifically, the mobile wireless terminal according to the present invention switches the operation mode thereof to the slave station mode under a base station higher in priority than the wireless terminal if the station status ID thereof indicates that the wireless terminal is operating in base station mode or that the wireless terminal is operating in slave station mode under another mobile wireless terminal operating as a base station when a FH control frame is received from one of the other stations. According to the present invention, a stationary base station is given the highest priority in advance. As a result, when stationary station coexists with a mobile wireless terminal operating in base station mode within the same communication area, for example, the operation mode of the mobile wireless terminal is switched from base station mode to slave station mode to thereby converge the functions of the base stations of the same area to the stationary base station.

According to still another aspect of the invention, there is provided a mobile wireless terminal comprising means for storing a group ID means for adding the group ID to the FH control frame when operating in base station mode, and means for checking the relation between the group ID stored in the local station with a group ID received from a FH control frame when the FH control frame is received from one of the other stations, wherein the FH control frame is neglected as an invalid frame if the two group IDs are not in a predetermined correspondence to each other.

According to the present invention, a mobile wireless terminal is provided with a storage means for storing at least a frequency-hopping pattern so that carrier frequency of communication frames and the FH control frame is changed at predetermined time intervals in accordance with the frequency hopping pattern while the mobile wireless terminal is operating in a base station mode. According to an embodiment of the invention, said storage means stores a plurality of hopping patterns, each of which is assigned an ID code, and each base station indicates the hopping pattern by sending the ID code in each FH control frame so that when a FH control frame is received from the base station each slave station specify the frequency hopping pattern by the ID code in the FH control frame.

According to a still further aspect of the invention, there is provided a mobile wireless terminal comprising means for checking the receiving conditions of a communication frame and detecting a sync frequency while switching the receiving frequencies successively, wherein the operation mode is switched to slave station mode when the sync frequency of the frame transmitted from another station is detected by the detection means at the initial time of operation, after which the transmission/receiving frequencies are switched in accordance with the frequency hopping pattern in synchronism with the receipt of the FH control frame from another station. When the transmission/receiving frequencies synchronous with another station fails to be detected after the synchronization attempt by the detection means, the operation mode is switched to the base station mode. When the receipt of the FH control frame from another station is delayed while operating in slave station mode, the transmission/receiving frequencies are switched in synchronism with the output from timer means, and when the delay of receipt of the FH control frame exceeds a predetermined length of time, the resynchronization by the detection means is carried out.

According to a yet further aspect of the invention, there is provided a mobile wireless terminal comprising first monitor means for monitoring the receipt of a FH control frame and a notice frame for notifying that a source thereof stands for a master station in order to cause the wireless terminal to operate in a slave station mode when the FH control frame is received during a first period, and second monitor means for monitoring the receipt of a FH control frame and a notice frame during a second period following the first period when the FH control frame is not received from any one of the other wireless equipment during the first period, the second monitor means causing the wireless station to operate in slave station mode when the FH control frame is received during the second period, switching the monitoring operation to the first monitor means when the FH control frame is not received but the notice frame is received during the second period, and causing the wireless station to transmit a notice frame to notify to other wireless equipment that the wireless terminal stands for a base station when neither the FH control frame nor the notice frame is received during a submonitor period shorter than the second period.

According to the present invention, since wireless communication equipment such as a mobile wireless terminal has a function of switching the operation mode in accordance with the surrounding situation, each wireless communication equipment can operate in master or base station mode when there is no other surrounding base station, to thereby ready itself for communication with other wireless communication equipment that have moved in from other control areas. When said wireless communication equipment in the base station mode moves toward another base station and two wireless communication overlap one of two base station switches operation mode to slave station mode by determining the transmission conditions of the FH control frame or the priority for the other base station, thereby to converge to a single base station in the control area. In this way, a communication system can be reconfigured automatically into an optimum form in accordance with the prevailing conditions.

According to the present invention, since a mobile wireless terminal has a function for checking the relation between the group ID of the mobile wireless terminal and the group ID received from the FH control frame, the FH control frame is treated as an invalid frame if a predetermined correspondence between the two group IDs, so that a plurality of wireless communication equipment belonging to different organizations or groups which may coexist in the same area can maintain the communication services independently of each other without inviting any confusion in control operation.

The foregoing and other objects, advantages, manner of operation and novel features of the present invention will be understood from the following detailed description when read in conjunction with the accompanying drawings.

BRIEF DESCRIPTION OF THE DRAWINGS

FIG. 3 is a diagram showing an example of a hopping pattern.

FIG. 4 is a diagram showing an example assignment of the time zone and the contents of communication during a unit hop interval.

FIG. 5 is a diagram showing a format of a communication frame.

FIG. 6A is a diagram showing a configuration of a stationary base station BST according to an embodiment.

DESCRIPTION OF THE PREFERRED EMBODIMENTS

Figure 1:
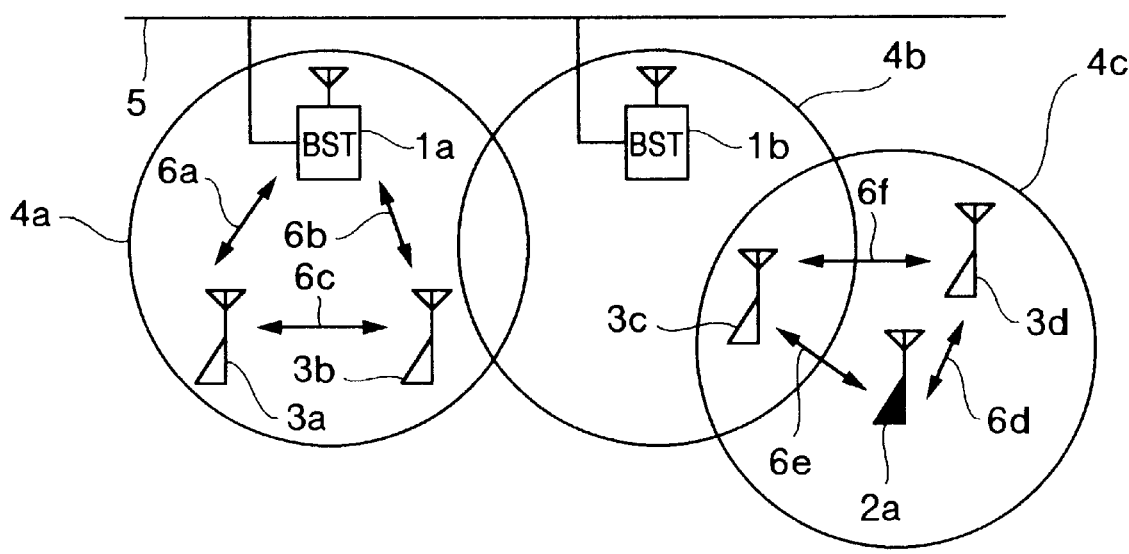
FIG. 1 is a diagram showing a general configuration of a mobile communication system according to an embodiment of the invention.

FIG. 1 shows a general configuration of a wireless LAN system for performing communication between terminals using the low-rate frequency hopping communication according to an embodiment of the invention.

The wireless LAN system comprises base stations 1a, 1b, 2a for generating a control frame for notifying the timing of frequency hopping within each control area (cell), and a plurality of mobile wireless communication equipment (hereinafter referred to as "SST") 3 (3a, 3b, 3c, 3d and so on) for receiving the control frame and hopping the frequencies at a hop timing in synchronism with the base station in each control area. SSTs 3a, 3b are synchronous with the hop timing of base station 1a, and SSTs 3c, 3d with the hop timing of the base station 2a. A method of synchronization between SST and the base station will be described in detail later.

The base stations include a stationary base station (hereinafter referred to as "BST") 1 (1a, 1b and so on) connected to a wired network 5 and a master station (hereinafter referred to as "MST") 2 (2a, 2b and so on) which is a mobile wireless terminal functioning as a base station within a group of wireless communication equipment. Reference numerals 4a, 4b designate control areas capable of communication with base stations 1 and 2 respectively and will hereinafter be referred to as the "cells". Communication between SSTs and between an SST and a base station are performed through a radio channel 6. BST 1a, for example, communicates with SST 3b using radio channel 6b.

In this wireless LAN system, the transmission/receiving carrier frequency is periodically hopped within each cell 4. According to the embodiment under consideration, the time during which the carrier remains at the same frequency, i.e., the hopping interval is 100 ms. The carrier frequency is periodically changed according to a predetermined hopping pattern such that a frequency sequence returns to the original frequency in 13 hops in the cell controlled by each BST and in 12 hops in the cells controlled by each MST.

Figure 2:
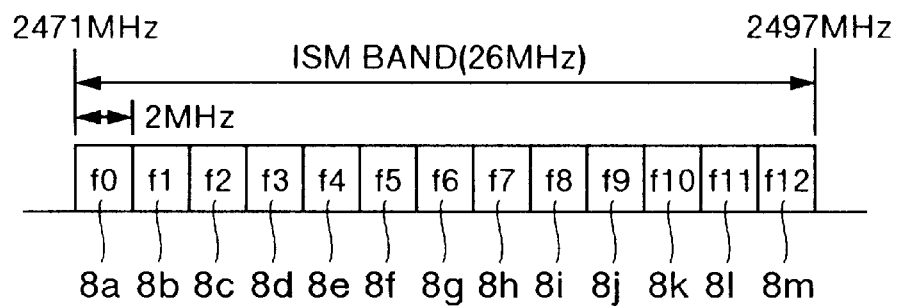
FIG. 2 is a diagram showing an example of frequency assignment for a mobile communication system according to the invention.

FIG. 2 shows an example of assignment of the carrier frequency used for the wireless LAN system described above.

This example uses an ISM band (26 MHz) of 2471 to 2497 MHz assigned for the spread spectrum communication system. This ISM band is divided into 13 subchannels 8a to 8m of 2 MHz width each. The center frequency of each carrier frequency is fi=2472+2i (i: 0, . . . 12) MHz. The base stations 1 (1a, 1b) and 2 and each SST 3 (3a, 3b, 3c, 3d) hop the subchannels (carrier frequencies) sequentially in accordance with a predetermined hopping pattern phase-shifted for each base station.

FIG. 3 shows an example of a frequency hopping pattern.

Hopping patterns are notified to all the wireless communication equipment in advance and stored as a hopping pattern table 10.

Each base station, when it is an MST, determines a selected one of the MST hopping patterns 11a to 11e according to a predetermined method. When the hopping pattern 11a is selected, for example, the carrier frequency is changed in the order of f0, f11, f7, f12, f9 , . . . ,f1, f0 for each 100 ms in a period of 12 hops. Each base station, when it is a BST, determines selected one of the BST hopping patterns 11f to 11j according to a predetermined method. When the hopping pattern 11f is selected, for example, the carrier frequency is changed in the order of f0, f6, f12, f5, f4, . . . ,f7, f10 for each 100 ms in a period of 13 hops.

FIG. 4 shows the relation between the time zone defined within one hopping interval (100 ms) 20 and the communication operation.

Each hopping interval is divided into four time zones including a time zone (RU) 21 during which arbitrary wireless communication equipment is capable of communication in CSMA (Carrier Sense Multiple Access) mode, a time zone (RN) 22 during which all the wireless communication equipment suppress transmission, a time zone (RF) 23 during which a base station transmits an FH control frame (hereinafter referred to as the "FH-MAC frame") for notifying the hop timing to each SST, and a dummy time zone (RD) 24 for performing the frequency hopping.

FIG. 5 shows a communication frame format 30 used for communication between the wireless communication equipment.

Numeral 31 designates a preamble (P) field required for establishing synchronism in physical layers. This field includes a unique word indicating the position of a valid bit in the communication frame.

Numeral 32 designates a frame control (FC) field including a frame identifier for discriminating the user frame and the control frame, a source identifier indicating whether the frame source is BST, MST or SST, and information indicating the length of each frame. The "user frame" as used herein indicates a frame used for transmission and receiving of user data, and the "control frame" a frame used for transmission and receiving of control information. The FH-MAC frame is a type of control frame.

Numeral 33 designates a destination address (DA) field, numeral 34 a source address (SA) field, numeral 35 an information (I) field, and numeral 36 a frame check sequence (FCS) field for detecting a frame error including a CRC associated with the contents of the fields 33, 34, 35.

Each communication frame transmitted by each stationary base station or each wireless communication equipment (mobile wireless terminal) requires a transmission time length sufficiently short as compared with the field RU 21. A plurality of communication frames, therefore, can be transmitted in the field RU 21 within one hopping interval. Also, the control frames other than the FH-MAC frame are transmitted in the field RU 21 together with the user frame.

FIG. 6A shows an example configuration of the stationary base station BST 1.

BST 1 includes an antenna 101, a modulator/demodulator 102, a wireless LAN controller 103, a wireless transmission buffer 104, a wireless receiving buffer 105, a ROM 106 for storing data such as the hopping pattern table 10 and various programs, a system bus 107, a CPU 108 for controlling the transmission and receiving of data, a main memory 109 for storing programs and data, a wired LAN controller 110, a wired transmission buffer 111 and a wired receiving buffer 112. The BST 1 is connected to a wired network 5 by a connector 113.

Figure 6B:
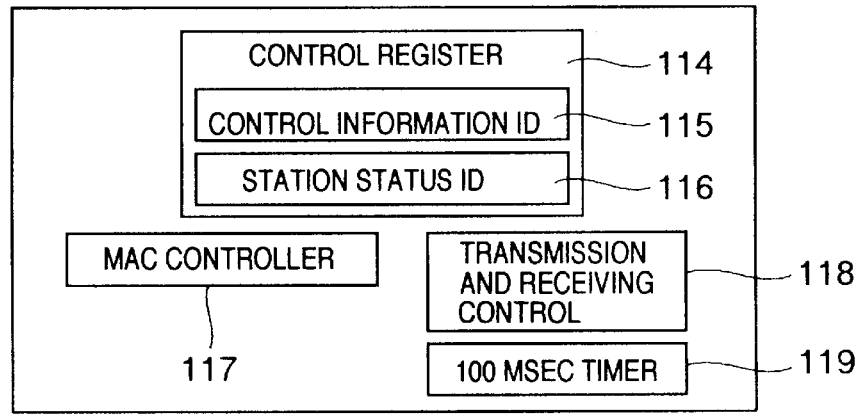
FIG. 6B is a diagram showing a wireless LAN controller 103 in detail.

The wireless LAN controller 103, as shown in FIG. 6B, includes a control register 114, a MAC controller 117 having the function of controlling the frequency hopping, a transmission/receiving controller 118 and a 100-ms timer 119. The control register 114 has stored therein a control information ID 115 indicating a group or organization the communication equipment belongs to and a station status ID 116 indicating whether the station is BST, MST or SST and whether the base station constituting a source of the control frame is BST or MST if the station operates as a SST.

The modulator/demodulator 102 has a function to modulate the signal of the transmission frame (transmission data) to transmit a modulated signal to the radio channel 5 through the antenna 101 at a hopping frequency (carrier frequency) designated by the control signal 100 from the wireless LAN controller 103 and to demodulate the signal of the received frame input through the antenna 101 from the radio channel 5 and send the received data to the wireless LAN controller 103. The transmission data is read from the main memory 109 to the transmission buffer 104 by the wireless LAN controller 103. Also, the received data are written into the main memory 109 through the wireless receiving buffer 105 by the wireless LAN controller 103.

The wired LAN controller 110 controls the transmission and receiving of data with the wired network 5. The data to be transmitted to the wired network 5 is read out from the main memory 109 to the wired transmission buffer 111, while the data received from the wired network 5 are written into the main memory 109 through the wired receiving buffer 112. The wireless LAN controller 103 and the wired LAN controller 110 transfer data to and from the main memory 109 through a system bus 107 in compliance with an instruction from the CPU 108.

Figure 7:
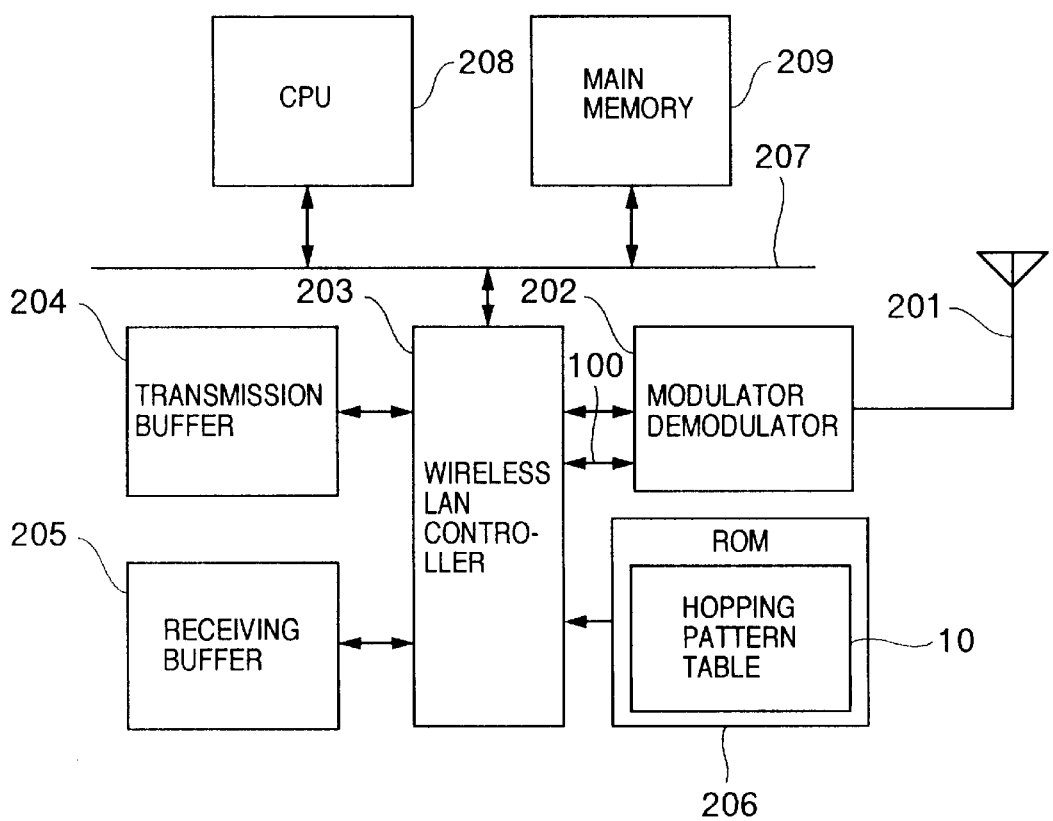
FIG. 7 is a diagram showing a configuration of a mobile station (MST/SST) according to an embodiment.

FIG. 7 shows an example configuration of a mobile wireless communication equipment (MST2 and SST2).

Each mobile wireless communication equipment includes an antenna 201, a modulator/demodulator 202, a wireless LAN controller 203, a wireless transmission buffer 204, a wireless receiving buffer 205, a ROM 206, a system bus 207, a CPU 208 and a main memory 209.

The wireless LAN controller 203, the configuration of which is similar to that of the wireless LAN controller 103 of a stationary base station shown in FIG. 6, has stored therein information including a control information ID 115, a station status ID 116, hopping control information 117 and transmission/receiving control information 118.

The control information ID 115 is a sort of group ID, and is used for deciding whether mobile wireless communication equipment operating as an MST and entering a cell under the control of another base station (MST or BST) returns to an ordinary SST or continues to operate as an MST in that particular cell. When the MST receives an FH-MAC frame from another base station and the control information ID in the I field 35 of the frame coincides with the control information ID 115 of the MST (i.e., when the MST and said another base station belong to the same group or the same organization), then the MST returns to an SST operating under the control of the particular base station. Otherwise, the MST continues to operate in an MST mode independent of the particular base station.

The SST and the base station are synchronized with each other in the manner described below.

Each SST, when asynchronous with the base station, for example, immediately after power is switched on, tries to receive the FH-MAC frame from the base station while changing the receiving frequencies rapidly from one to another. As soon as the FH-MAC frame is successfully received and the control information ID indicated in the FH-MAC frame coincides with the control information ID set in the SST, the 100-ms timer 119 is reset so that the hopping timing is synchronized with the FH-MACH frame. The SST once synchronized with the base station receives the FH-MAC frame at intervals of 100 ms. The coincidence between the carrier frequency of the FH-MAC frame and the receiving frequency may be awaited at the cost of a longer acquisition time.

Even when the synchronization with the FH-MAC frame is disrupted, each SST continues the frequency hopping operation on the basis of its 100-ms timer, and when the receiving delay of the FH-MAC frame exceeds a threshold value, decides on an out-of-phase condition and tries to synchronize the frequency with the FH-MAC frame by changing the receiving frequency.

According to the present invention, when the FH-MAC frame cannot be received in normally after the lapse of a predetermined time of continuous attempt at frequency synchronization with the FH-MAC frame by changing the receiving frequency, the particular SST functions as a master station MST and to transmit the FH-MAC frame for each 100 ms in accordance with its timer, thereby reconfiguring the cells.

Figure 8:
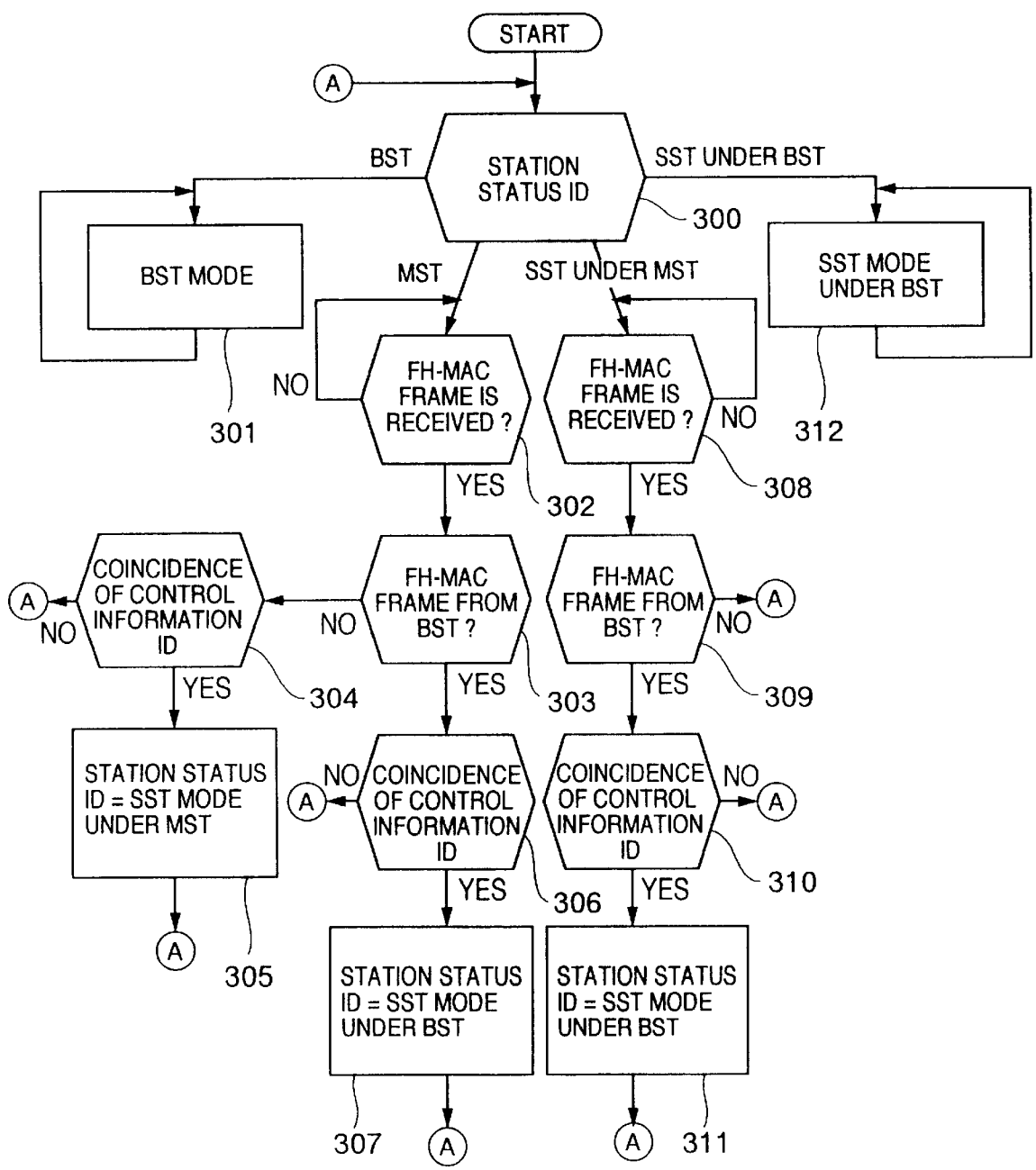
FIG. 8 is a flowchart showing the operation of a wireless communication equipment (a stationary base station and a mobile station).

FIG. 8 is a flowchart showing the control operation performed by each wireless communication equipment including a stationary base station.

The operation of each wireless communication equipment is different depending on the state of the station status ID 116 (step 300). If the station status ID 116 is that of BST (stationary base station), the wireless communication equipment continues to operate as a BST (step 301). In this case, the station status ID remains unchanged even when the FH-MAC frame produced by other stations is received.

When the station status ID 116 is set to "SST under the control of BST" (BST slave station mode), the wireless communication equipment continues to operate as an SST (step 312).

When the station status ID 116 is MST (master station mode), on the other hand, the receipt of the FH-MAC frame (step 302) is followed by identifying the source of the particular FH-MAC frame (step 303).

When the source of the FH-MAC frame is a BST, the control information ID of the received frame is compared with the control information ID 115 (step 306), and if they coincide with each other, the station status ID 116 is changed to "SST under the control of BST" (step 307). When the control information ID of the received frame fails to coincide with the control information ID 115, in contrast, the operation is continued as an MST. When the source of the FH-MAC frame is not a BST (in the case of other MST), on the other hand, the control information ID of the received frame is compared with the control information ID 115 (step 304). If the IDs are coincident with each other, the station status ID 116 is changed to "SST under the control of MST" (step 305).

Upon receipt of the FH-MAC frame when the station status ID 116 is "SST under the control of MST" (MST slave station mode)(step 308), the source of the particular FH-MAC frame is identified (step 309). When the source of the FH-MAC frame is a BST, the control information ID of the received frame is compared with the control information ID 115 (step 310), and if they are coincident with each other, the station status ID 116 is changed to "SST under the control of BST" (step 311). When the two control information IDs fail to coincide with each other, on the other hand, the operation is continued in MST slave station mode. When the source of the FH-MAC frame is not a BST and the control information ID of the received frame is not coincident with the control information ID 115, the station functions as an SST under the control of a MST without changing the station status ID 116.

Figure 9:
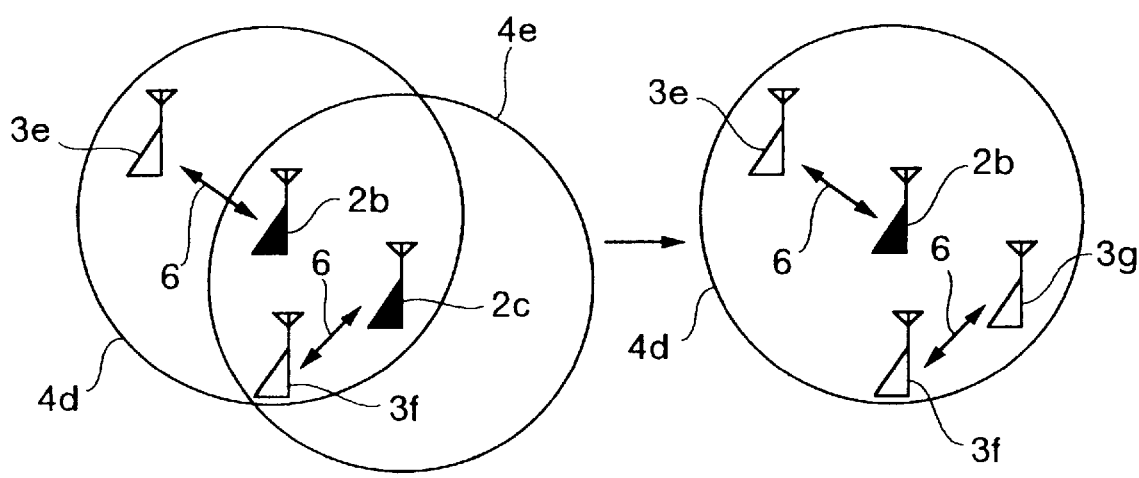
FIG. 9 is a diagram for explaining an example of cell reconfiguration.

FIG. 9 shows the operation of the mobile wireless communication equipment 2c functioning as a MST receiving the FH-MAC frame from another MST 2b.

When the control information ID of the FH-MAC frame coincides with the control information ID 115 set in the MST 2c (when the decision at step 304 is affirmative), the MST 2c immediately changes the hopping timing and, after that, operates as a SST 3g under the control of the MST 2b (step 305).

Figure 10:
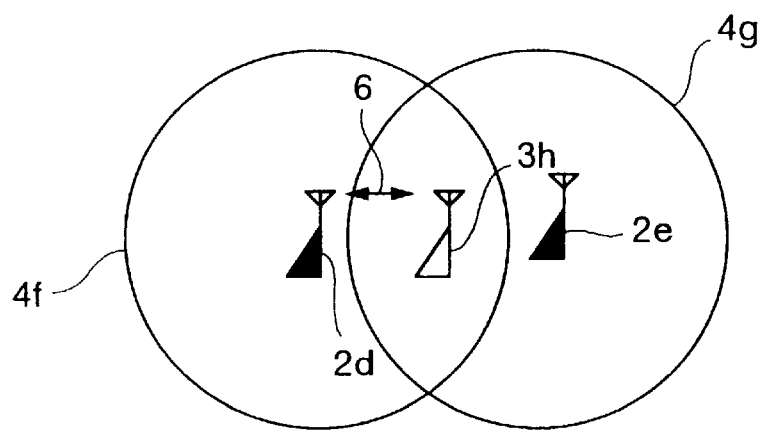
FIG. 10 is a diagram for explaining another example of cell reconfiguration.

FIG. 10 shows the operation associated with the case in which a SST 3h located in the cell 4f of the MST 2d and under the control of the MST 2d receives the FH-MAC frame from another MST 2e (When the decision is negative at step 308). The SST 3h performs the frequency hopping in synchronism with the hopping timing of the MST 2d regardless of the control information ID of the FH-MAC frame issued from the MST 2e.

Figure 11:
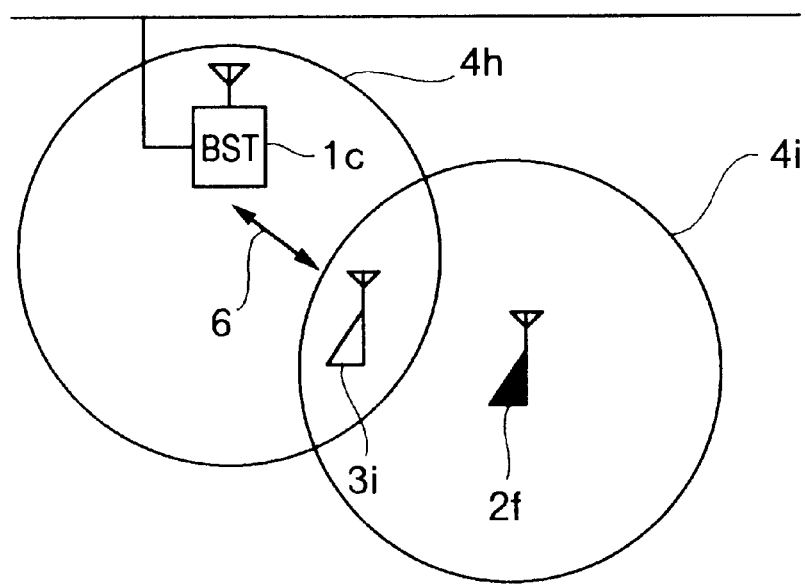
FIG. 11 is a diagram for explaining still another example of cell reconfiguration.

FIG. 11 shows the operation associated with the case in which a SST 3i located in the cell 4h of the BST 1c and under the control of the BST 1c receives the FH-MAC frame from a MST 2f (step 312). The SST 3i performs the frequency hopping in synchronism with the hopping timing of the BST 1c regardless of the control information ID of the FH-MAC frame from the MST 2f.

Figure 12:
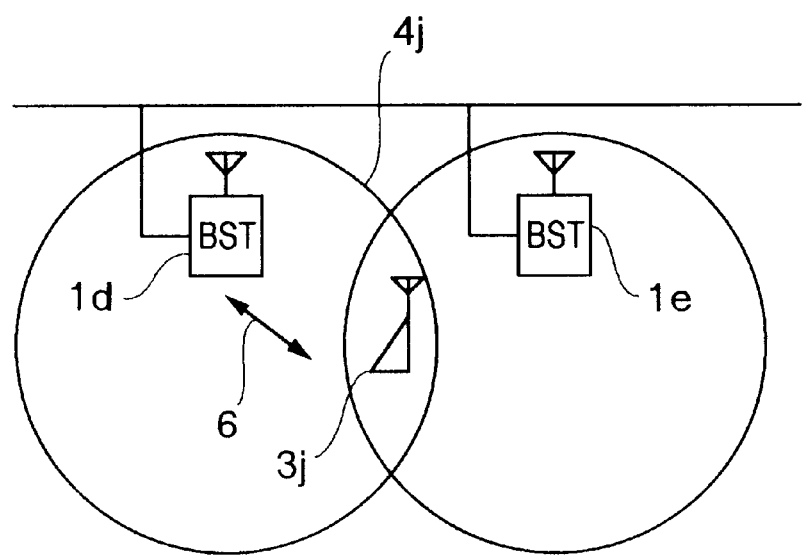
FIG. 12 is a diagram for explaining a further example of cell reconfiguration.

FIG. 12 shows the operation for the case in which a SST 3j under the control of the BST id receives the FH-MAC frame transmitted by another BST1e (step 312). In this case also, the SST 3j performs the frequency hopping operation in synchronism with the hopping timing of the BST 1d regardless of the control information ID of the FH-MAC frame from the BST 1e.

Figure 13:
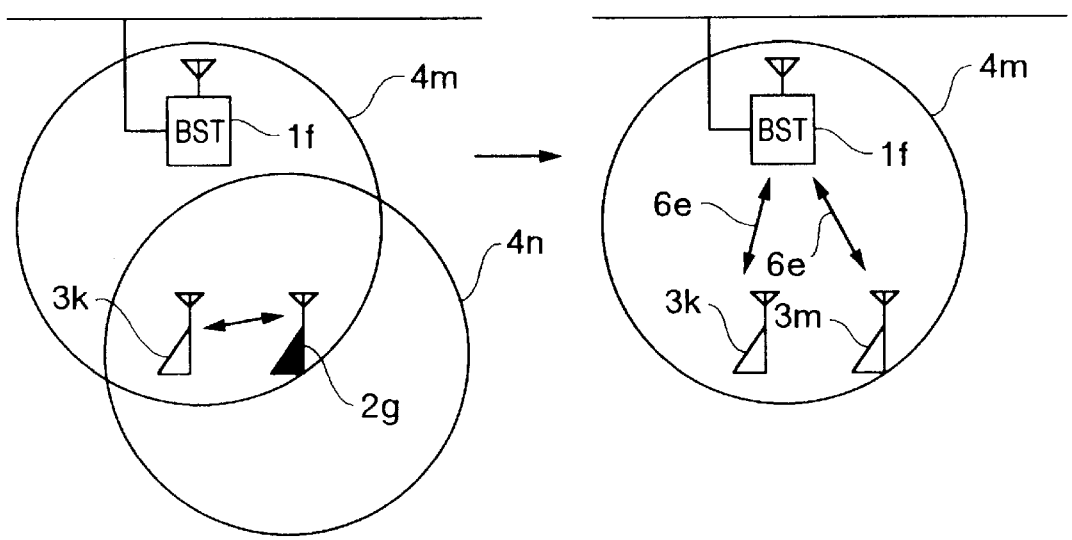
FIG. 13 is a diagram for explaining a still further example of cell reconfiguration.

FIG. 13 shows the operation associated with the case in which a SST 3k under the control of the MST 2g located within the cell 4n of the MST 2g receives the FH-MAC frame from the stationary base station BST 1f (in the case where the decision at step 309 is affirmative).

The SST 3k changes the station status ID to "SST under the control of BST" in synchronism with the hopping timing of a BST having a higher priority than the MST 2g (step 307). The MST 2g that has thus far operated as a base station enters the status of "SST under the control of BST" in a manner similar to the SST 3k (step 307).

A mobile wireless terminal located in the vicinity of a stationary base station connected to a wired network 5 is desirably adapted to transmit and receive data with the wired network 5 through the stationary base station. For this reason, according to the invention, priority is given to the stationary base station BST over the base station (master station) MST comprising of a mobile wireless communication equipment, so that the mobile wireless communication equipment moving into a BST cell and operating as an SST or MST is placed under the control of the BST higher in priority.

According to this embodiment, the switching of the operation mode in accordance with the priority of the base station is controlled by reference to the station status ID 116 stored in each communication equipment.

Figure 14:
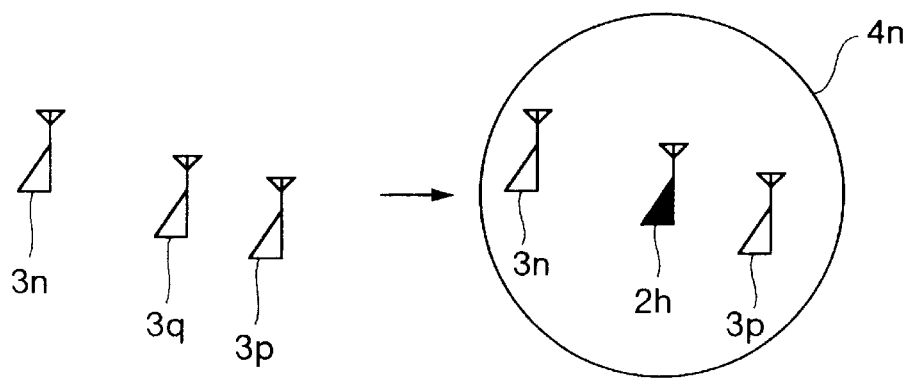
FIG. 14 is a diagram for explaining a yet further example of cell reconfiguration.

FIG. 14 shows a SST operation associated with the case in which a BST or a MST that has thus far operated as a base station disappears due to a power failure or a device malfunction.

When the base station in operation disappears and the FH-MAC frame from this base station ceases to be transmitted, each SST that has thus far been located in the cell of the particular base station is changed to MST by the timer operation and starts to transmit the FH-MAC frame.

Assume that a SST 3q first switches to a MST 2h and starts transmission of the FH-MAC frame. Other slave stations 3n, 3p that have received the FH-MAC frame perform the frequency hopping operation in synchronism with the MST 2h and operate as an SST under the control of an MST 2h. In this way, a new cell 4n is configured.

Assume that a plurality of SSTs convert to MSTs substantially at the same time and each station begins transmission of the FH-MAC frame. As a result of the cell reconfiguration shown in FIG. 9, only one mobile wireless communication equipment remains as an MST while the other stations return to SST status.

Figure 15:
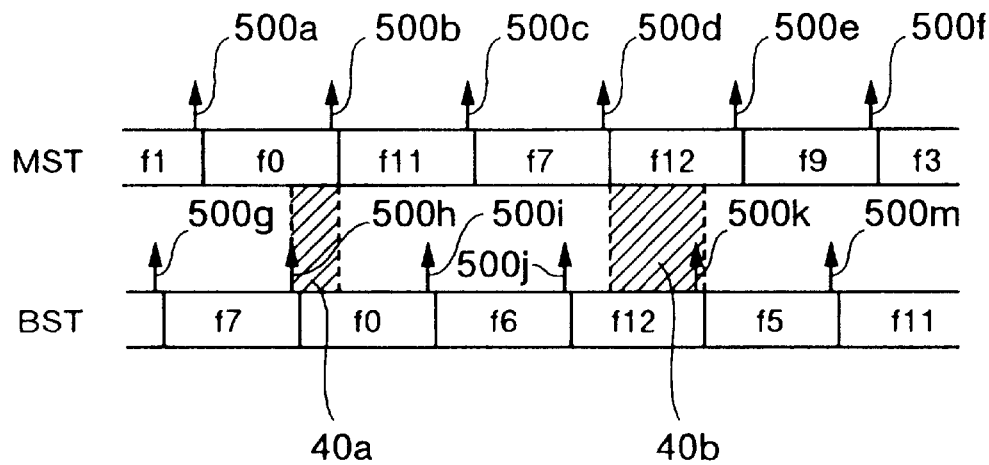
FIG. 15 is a diagram for explaining the frequency hopping for BST and MST.

FIG. 15 is a diagram for explaining the reason why, for example, a SST 3c under the control of a MST 2a can receive the FH-MAC frame transmitted from a BST 4b as shown in FIG. 1.

Assume that numeral 500 (a to m) designates FH-MAC frames and that the BST 1b selects a hopping pattern "BST#1"11f, and the MST 2a selects a hopping pattern "MST#1" 11a in FIG. 3.

In this case, as shown in FIG. 15, the two stations 1b and 2a use the same frequency at channels 40a, 40b at time intervals of at least 15.6 seconds (=100 ms×13×12).

The SST 3c is capable of recognizing that the source of the received FH-MAC frame 500k is a BST 1b from the contents thereof and can know the control information ID of the BST 1b from the contents of the I field 35. When the control information ID received coincides with the control information ID stored in the SST 3c, the SST 3c immediately can switch the hopping series to the BST pattern ("BST #1" in this case) 11f in synchronism with the hopping timing of the BST 1b.

According to this embodiment, the applicable hopping pattern 10 can be specified at the time of receiving the FH-MAC frame by setting the control information ID in correspondence with the hopping pattern 10.

When the control information ID is set to "1" for all the wireless communication equipments associated with a group, for example, the BST and the SSTs under the control of the BST are assumed to use the hopping pattern "BST #1" 11f, and the MST and the SSTs under the control of the MST are assumed to use the hopping pattern "MST #1" 11a. Then, when the base station is switched from SST to BST, a new hopping pattern 11f can immediately be specified.

Figure 16:
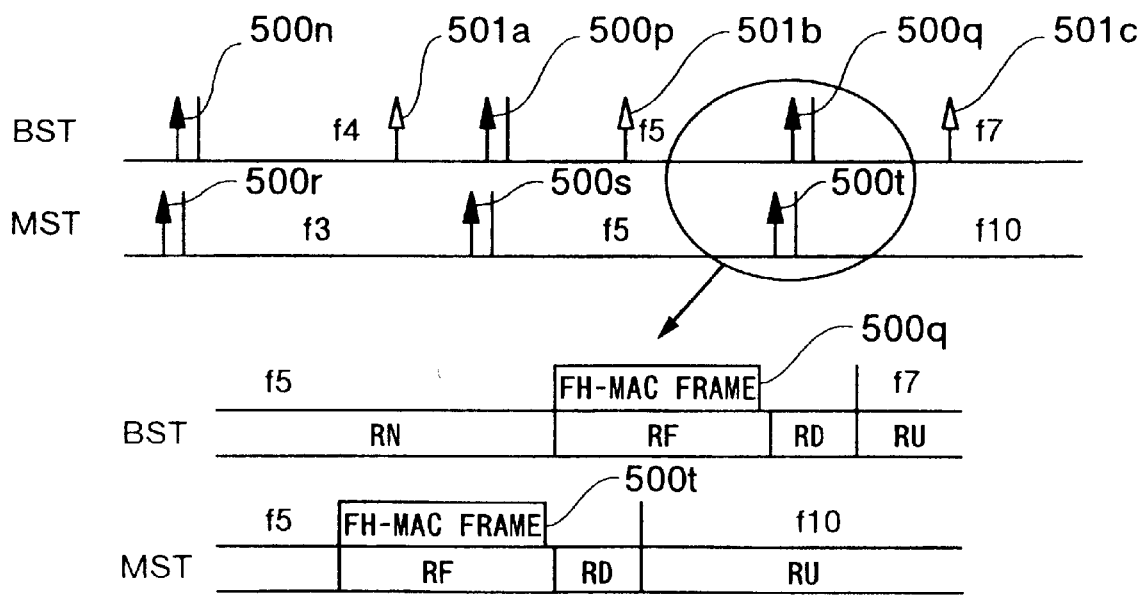
FIG. 16 is a diagram for explaining the operation when the periods of frequency hopping are overlaid.

FIG. 16 shows a protective method against a presumable case where the hopping timing of BST and MST occur substantially at the same time.

In the system configuration shown in FIG. 1, for example, assume that the hopping timing of the BST 1b and the MST 2a occur substantially at the same time as shown in FIG. 16. The SST 3c, even though capable of receiving the FH-MAC frame 500t from the MST, cannot receive the FH-MAC frame 500q from the BST 1b. This is by reason of the fact that at the time point when the BST 1b transmits the FH-MAC frame 500q at a frequency f5, for example, the SST 3c that has thus far operated at the frequency f5 switches the frequency from f5 to f10 during transmission of the FH-MAC frame 500q in synchronism with the FH timing of the MST 2a.

A method recommended for avoiding this inconvenience of receiving failure is, for example, by making an arrangement for the BST to transmit the FNP-MAC frame 501 (501a, 501b, . . . ) in the RU field 21 defined before the RF field 23 where the FH-MAC frame is sent as shown in FIG. 4. The FNP-MAC frame 501 is one of the control frames for indicating the presence of the BST.

The SST 3c returns once to the initial state upon recognition of the presence of the BST by receiving the FNP-MAC frame 501, and can be synchronized with the frequency hopping of the stationary base station BST 1b by performing the frequency synchronizing operation from the search mode changing the receiving frequency.

Figure 17:
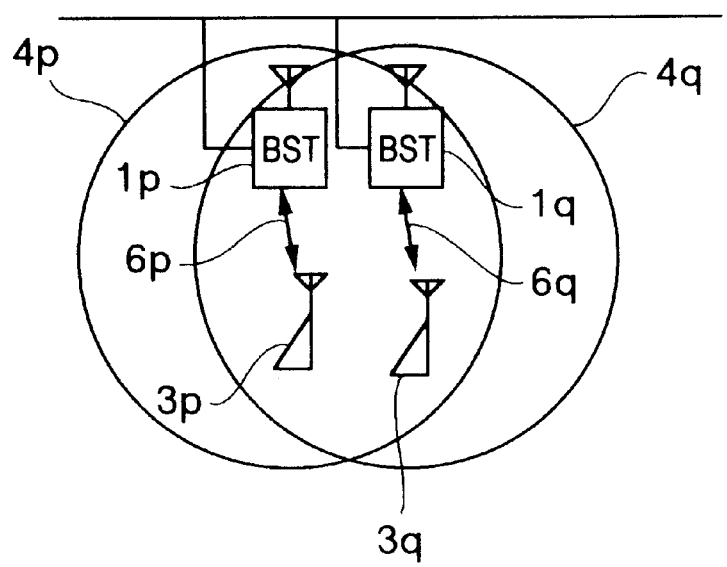
FIG. 17 is a diagram for explaining the function of a control information ID.

FIG. 17 is a diagram for explaining the function of the control information ID 115.

The control information ID 115 is a type of group ID provided for permitting mutual communication between terminals of identical ID. The control information ID on the base station side is indicated in the information transfer field (I field) of each FH-MAC frame.

Each mobile wireless communication equipment at the receiving side compares its own control information ID with the control information ID in the received frame, and only when they coincide with each other, validates the information in the frame. In other words. When the control information ID for the SST is different from that for BST or MST, the SST ignores the received FH-MAC frame. By utilizing this control information ID, a communication network can be formed independently for each group.

In the case shown in FIG. 17, an identifier "*1", for example, is set as the control information ID 115p for the BST 1p and the SST 3p, and an identifier "*2" as the control information ID 115q for the BST 1q and the SST 3q. Regardless of mutual approach between the respective BSTs or between the respective SSTs, the SST 3p can always follow the FH-MAC frame from the BST 1p and the SST 3q always to follow the FH-MAC frame from the BST 1q.

According to the above-mentioned embodiment, each base station has a uniform hopping interval. In spite of this, different base stations may have different hopping intervals as a modification of the invention.

Assume that the hopping interval of MST is 90 ms and that of BST 100 ms and that as in the aforementioned embodiment, the station status ID and the control information ID of the source base station are notified in each FH-MAC frame. Each SST decides whether the source of the FH-MAC frame is MST or BST from the contents of the FH-MAC frame received, and stores the resulting information as a station status ID of the particular SST. The timer for subsequently counting the hopping interval is changed in the reset timing in accordance with the station status ID. When the hopping interval is differentiated between MST and BST in this way, the above-mentioned inconvenience due to the overlaid hopping intervals is obviated to thereby eliminate the need of synchronous operation by the FNP-MAC frame. Also, the number of hops for each period is not required to be changed between MST and BST.

Now, explanation will be made for the processing sequence for determining the terminal operation mode utilizing a notice frame which is effective for switching one of a plurality of SSTs (3n, 3q, 3p) in a cell to a MST as explained in FIG. 14 in the event that a BST or a MST that has thus far operated as a base station in the same cell disappears due to a power failure or the like.

The notice frame is for notifying other mobile wireless terminals in advance that a mobile wireless terminal in SST status changes to an MST. As with the user frame, the notice frame is transferred from the receiving buffer 205 to the main memory 209 and processed by the CPU 208.

According to this embodiment, each of mobile wireless terminals (MST 2 and SST 3) uses three timers (Ta, Tb, Tc) realized by the timer function of the CPU 208 shown in FIG. 7.

Figure 18:
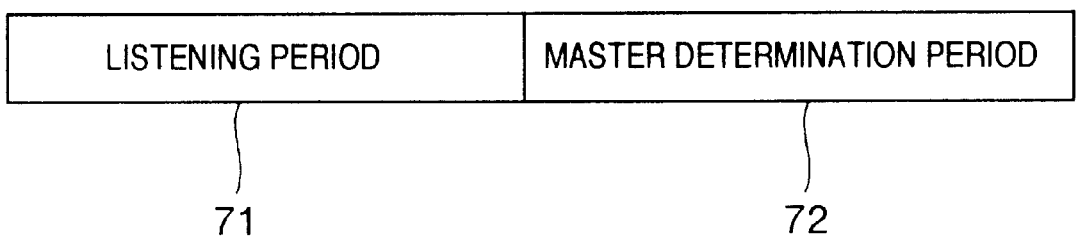
FIG. 18 is a diagram showing two monitoring periods during which the determination of the operation mode of each mobile wireless terminal is controlled at the time of power on or in the absence of a base station (or a master station).

The timer Ta, as shown in FIG. 18, defines the listening period 71 constituting a first monitor period for monitoring the receipt of the notice frame and the FH control frame transmitted by other mobile wireless terminals, and the timer Tb defines the master determination period 72 constituting a second monitor period for determining the mobile wireless terminal to be an MST on the basis of the result of monitoring the control frame during each listening period 71.

The timer Tc, on the other hand, is a random timer for causing each mobile wireless terminal to transmit a notice frame at different timings by avoiding the conflicts between a plurality of notice frames. A timer with a low temporal accuracy, for example, may be used in place of the random timer.

In the description that follows, the 100-ms timer 119 for determining the hopping period included in the wireless LAN controller 203 is called a hopping timer Td.

According to this embodiment, the wireless LAN controller 203 monitors the presence or absence of the receipt of the FH control frame for each hopping period (100 ms) specified by the hopping timer Td, and the CPU 208 of each wireless terminal counts the non-receipt period of the FH control frame on the basis of the report from the wireless LAN controller. The CPU 208 resets the counter where the wireless LAN controller has received the FH control frame, and when the count exceeds a predetermined value n, decides that the BST or MST has disappeared from the cell and executes the control flow for switching the terminal mode as described below.

Figure 19A:
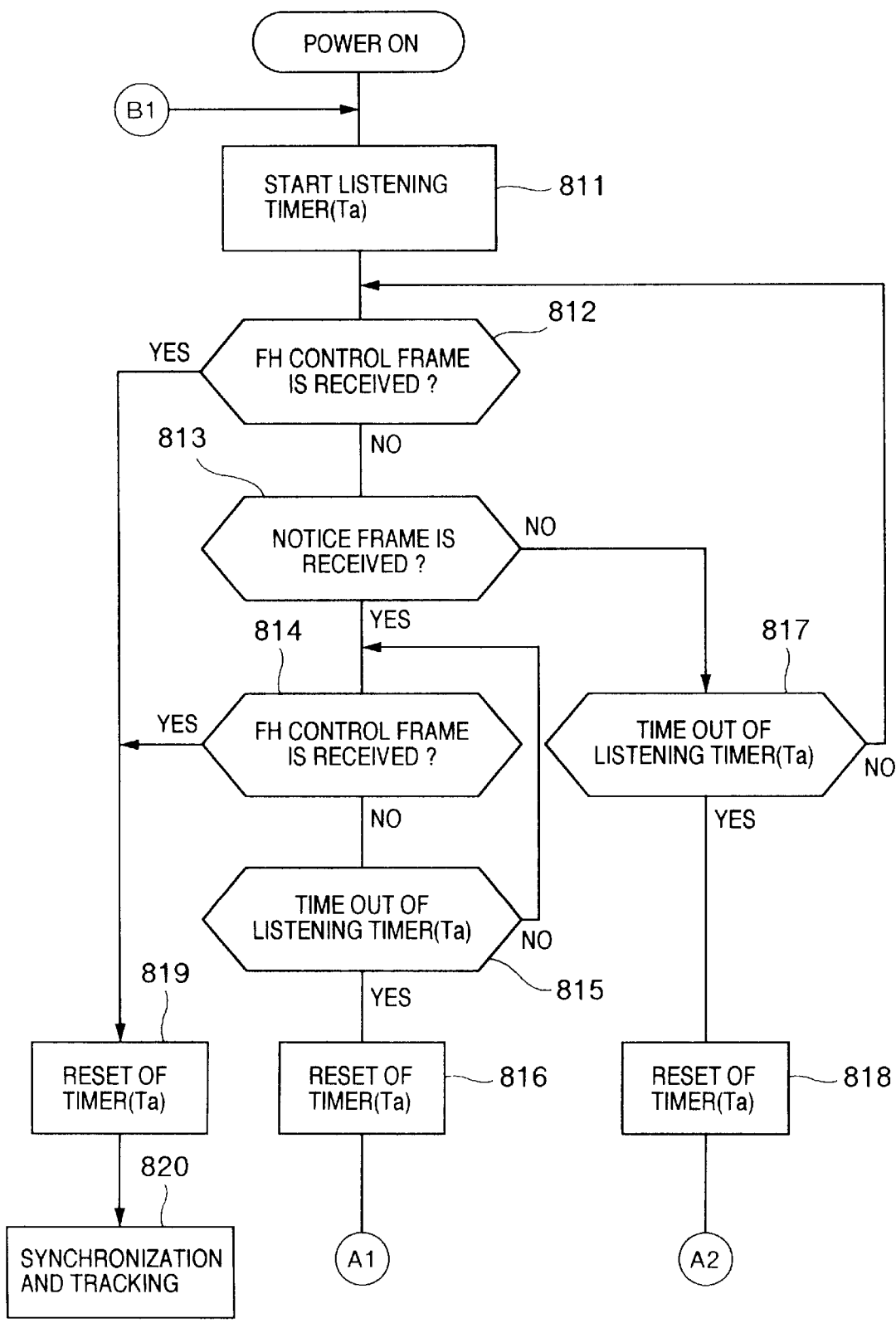
FIG. 19A is a flowchart showing a first monitor control sequence carried out in a listening period 71.
Figure 19B:
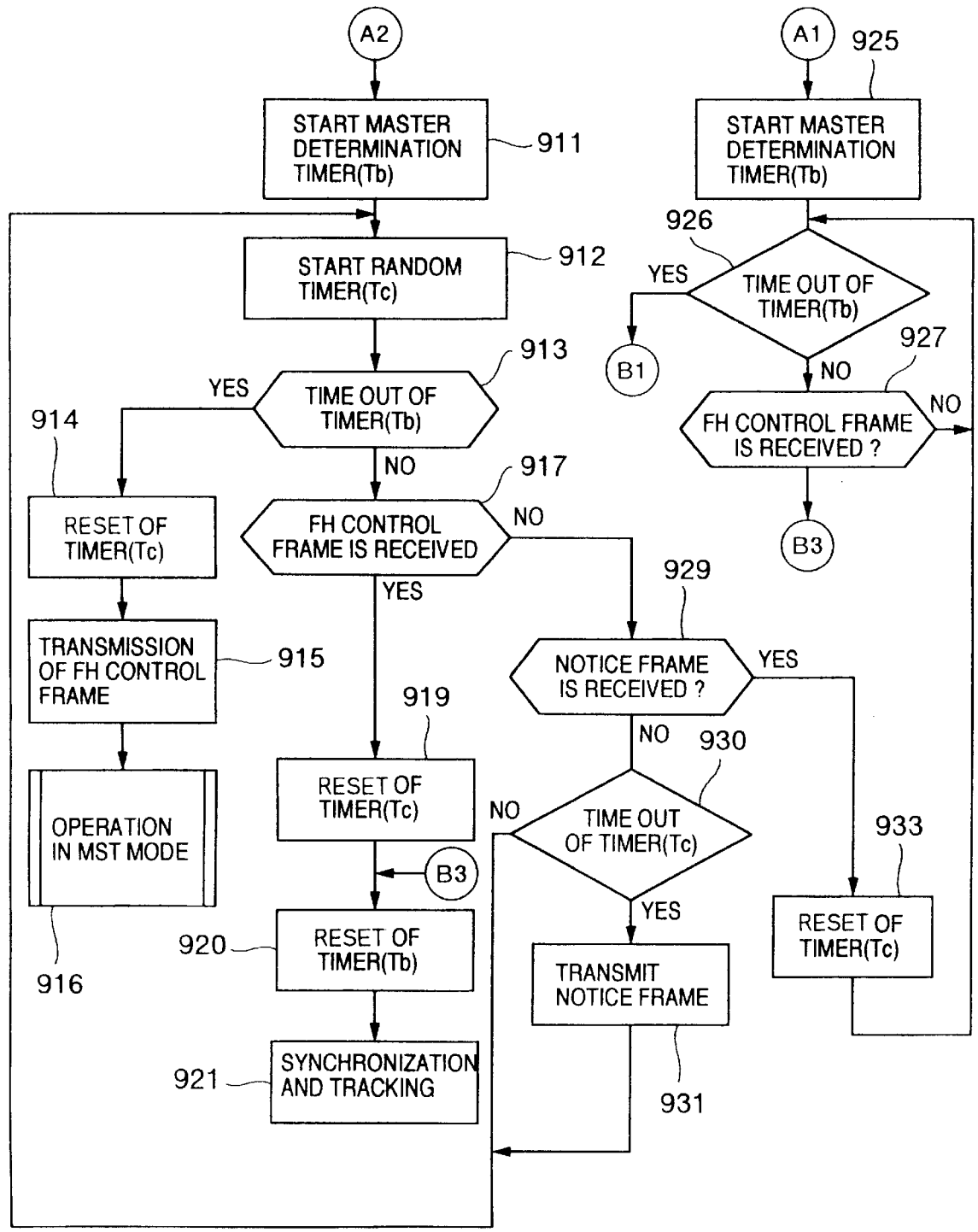
FIG. 19B is a flowchart showing a second monitor control sequence carried out in a master determination period 72.

FIG. 19A shows a processing sequence of the first monitor operation carried out during the listening period 71, and FIG. 19B a processing sequence of the second monitor operation executed during the master determination period 72.

During the listening period 71, basically, the arrival of the FH control frame is monitored, and upon receipt of the FH control frame, indicating that a MST or a BST already exists, the station status ID indicating the operation mode is set to BST slave station mode or MST slave station mode.

In the case where neither the FH control frame nor the notice frame is received during the listening period 71, the notice frame is transmitted at a timing specific to each terminal determined by the random timer Tc during the next master determination period 72. Unless the FH control frame or the notice frame is received from other stations during the master determination period 72, the operation mode is set to the MST station mode and the transmission of the FH control frame is started. If the FH control frame is received from other stations during the master determination period 72, on the other hand, the operation mode is set to the BST slave station mode or the MST slave station mode. When the notice frame is received from another station during the master determination period 72, indicating that a plurality of MST candidates are contesting, the transmission operation of the notice frame from the particular station is stopped, and the process is returned to the first monitoring status. During the listening period 71, the transmission of the user frame is inhibited in order to avoid the case in which the right receiving operation is impossible due to the conflicts between the transmitted frame and the received frame.

In the first monitor operation during the listening period 71, as shown in FIG. 19A, the timer Ta for determining the listening period 71 is started (step 811), after which whether the FH control frame has been received or not is decided on the basis of the notice from the controller 203 (step 812).

When the FH control frame is found to have been received, indicating the existence of a BST or a MST, the timer Ta is reset (step 819). The operation mode is set to the slave station mode and the synchronization and tracking process is effected (step 820). In the synchronization and tracking process, the hopping controller of the wireless LAN controller 203 synchronizes the frequency switching timing of a synthesizer with the BST or the MST in accordance with the FH control frame received. More specifically, the frequency of the synthesizer is switched to the carrier frequency specified by the FH control frame after the lapse of a predetermined length of time from the receipt of the FH control frame.

When the FH control frame is not yet received, whether the notice frame has been received or not is decided (step 813). If the notice frame is found to have been received, the arrival of the FH control frame continues to be monitored until the timer Ta goes time-out (steps 814, 815). When the FH control frame is received during the listening period 71, the timer Ta is reset (step 819), the operation mode is set to slave station mode, and the synchronization and tracking process is effected (step 820).

If the FH control frame is not received but the notice frame before the timer Ta goes time-out, the timer Ta is reset (step 816), and the process proceeds to step 925 in FIG. 19B. When neither the FH control frame nor the notice frame is received with the timer Ta going time-out (step 817), on the other hand, the timer Ta is reset (step 818) and the process proceeds to step 911 in FIG. 19B.

When only the notice frame is received during the listening period, the master determination timer Tb is started in the second monitoring operation of FIG. 19B (step 925), and the receipt of the FH control frame continues to be monitored until the timer Tb goes time-out (steps 926, 927). If the FH control frame is received, the timer Tb is reset (step 920), and the synchronization and tracking process is performed with the operation mode set to the slave station mode (step 921). When the timer Tb goes time-out without receiving the FH control frame, the process returns to step 811 in FIG. 19A, and the first monitoring operation for the listening period 71 is repeated.

When neither the FH control frame nor the notice frame could be received during the listening period, the master determination period timer Tb is started in the second monitoring operation (step 911), and the random timer Tc for determining the transmission timing of the notice frame is started (step 912). The timer Tc goes time-out within a time shorter than the timer Tb. After that, whether the timer Tb has gone time-out or not is decided (step 913). Unless the timer Tb has not gone time-out, whether the FH control frame is received or not is decided (step 917).

When the FH control frame is received, the timers Tb and Tc are reset (steps 919, 920), and after that, the synchronization and tracking process is effected (step 921).

Unless the FH control frame is received, whether or not the notice frame has been received is decided (step 929). If neither the FH control frame nor the notice frame can be received, it indicates the absence of a SST that tries to be a MST. In such a case, the notice frame is transmitted (step 931) at the time point when the random timer Tc goes time-out (step 930). Until the random timer Tc goes time-out, the process returns to step 912 to continue monitoring the receipt of the FH control frame and the notice frame.

When the random timer Tc goes time-out without receiving the FH control frame or the notice frame, the notice frame is transmitted (step 931) and then the timer Tc is restarted (step 912). As a result, as far as the non-receipt condition of the FH control frame and the notice frame continues, the notice frame is transmitted each time the timer Tc goes time-out. The use of the random timer Tc differentiates the transmission timing of the notice frame among the SSTs.

When the notice frame is received from another station before the timer Tb goes time-out (step 929), the random timer Tc is reset (step 933) and the receipt of the FH control frame is monitored (steps 926, 927). If the FH control frame is received before the timer Tb goes time-out, the timer Tb is reset (step 920), followed by effecting the synchronization and tracking process (step 921). In the case where the FH control frame is not received before the timer Tb goes time-out, the process returns to the first monitoring operation.

When the timer Tb goes time-out after repetition of several transmissions of the notice frame (step 913), the random timer Tc is reset (step 914), and the FH control frame is transmitted (step 915). After that, the hopping controller of the wireless LAN controller is instructed to set the station status ID to the master station mode (step 916).

As the result of the above-mentioned control flow, the SST that has transmitted the notice frame earliest during the master determination period is set to MST mode for transmitting the FH control frame periodically, and the other SSTs in the cell are set to MST slave station mode synchronized with the FH control frame. In this case, provision is made to stop the transmission operation of the notice frame in the event that the SST that has transmitted the notice frame receives the notice frame from another SST during the master determination period 72. Even in the case where a plurality of SSTs happen to transmit a notice frame in competition with each other for some reasons, therefore, the number of SSTs continuing the transmission operation of the notice frame decreases rapidly, so that the absence of the MST can be accommodated within a short time.

The process for determining the terminal operation mode including the above-mentioned two monitoring periods is carried out at the time of powering on each mobile wireless terminal as well as in the case of substantial absence of a master station due to such causes as the power failure in the master station (BST or MST), temporary shielding of radio wave propagation or the distance exceeding the range of radio wave propagation that may occur while each mobile wireless terminal is operating in SST mode.

It will thus be understood from the foregoing description that according to the invention, the operation mode is automatically changed from the master station mode to the slave station mode or the other way around by each wireless communication equipment in accordance with the surrounding conditions without any special instructions from the user. The frequency-hopped communication system can thus be reconfigured flexibly. Also, a plurality of mobile wireless communication equipments, which are operating out of a cell having a stationary base station, can cause one of the mobile wireless communication equipments to operate as a base station automatically. Even in the absence of a stationary base station, therefore, the frequency-hopped communication is possible between such mobile wireless communication equipments. The mobile base station is switched to an SST under control of a stationary base station when it moves into the cell having the stationary base station. Communication with other communication equipments existing in wider areas thus is made possible.

We claim:

1. A wireless communication system comprising:
   a plurality of wireless stations having two operation modes, including:
   a base station mode for periodically generating a frequency hopping (FH) control frame for synchronizing the hopping operation of transmission/receiving frequencies, and
   a slave station mode for performing the frequency hopping operation in synchronism with the FH control frame generated by one of the other stations;
   wherein each of said wireless stations includes:
      means for storing a status ID indicating the relation between the wireless station and the base station; and
      control means for selecting one of said two operation modes in accordance with the relation between the station status ID of the wireless station and another base station transmitting an FH control frame when the FH control frame is received; and
      wherein the operation mode of one of two wireless stations both operation in base station mode is switched to the slave station mode when the two wireless stations approach each other within a communication range.

2. A wireless communication system according to claim 1, wherein said wireless stations include a first class of communication equipment having a high priority for changing the operation mode and a second class of communication equipment having a low priority for changing the operation mode;
   the first class of communication equipment continue the operation in base station mode regardless of the priority of said another base station issued said FH control frame; and
   the second class of each communication equipment switches the operation mode to the slave station mode upon receiving the FH control frame from the first class of communication equipment when the station status ID if the second-class communication equipment indicates a selected on of the facts that the communication equipment is in the base station mode and that the communication equipment is in the slave station mode under another wireless communication equipment operating as a base station.

3. A wireless communication system according to claim 2, wherein the first class of communication equipment is a stationary base station connected to a network, and the second class of communication equipment is a mobile terminal.

4. A wireless communication system according to claim 1, wherein each of said wireless stations includes means for storing a group ID, and means for adding the group ID to the FH control frame when the wireless station is operating in base station mode; and
   when the FH control frame is received from another station, the control means checks the relation between the group ID stored in the wireless station and a group ID received from the FH control frame, and when there exists no predetermined correspondence between the two group IDs, the FH control frame is invalidated in switching the operation mode.

5. A wireless communication system according to claim 1, wherein the wireless stations include a plurality of mobile terminals and at least one stationary base station connected to a network;
   said stationary base station and said mobile terminals each include means for storing a frequency hopping pattern;
   each of said mobile terminals includes means for checking the receipt of a communication frame and detecting a sync frequency while switching the receiving frequencies; and each of the mobile terminals operating in base station mode and the stationary base station change the carrier frequency of the FH control frame and communication frames at a predetermined time interval in accordance with the frequency hopping pattern, and each mobile terminal switches the receiving frequency according to the frequency hopping pattern in synchronism with the receipt of the FH control frame after the detection means detects the sync frequency.

6. A mobile wireless terminal constituting a station of a frequency-hopped wireless communication system said mobile wireless terminal, comprising:

storage means for storing a status ID indicating the relation between the wireless terminal and a base station; and control means for selecting, in accordance with the relation between said status ID and another station when the wireless terminal receives a frequency hopping (FH) control frame generated from said another station for synchronizing the hopping operation of the transmission/receiving frequencies, one of the operation modes including a base station mode in which the wireless terminal generates a FH control frame periodically and performs the frequency hopping operation periodically and a slave station mode in which the wireless terminal performs the frequency hopping operation in synchronism with the FH control frame generated by said another station.

7. A mobile wireless terminal according to claim 6, wherein said control means includes means for switching the operation mode of the wireless terminal to the slave station mode if the wireless terminal receives said FH control frame from another station having higher priority when said station status ID indicates one of the facts that the wireless terminal is in the base station mode and that the wireless terminal is in the slave station mode under one of the other mobile wireless terminals operating as a base station.

8. A mobile wireless terminal according to claim, wherein said control means includes means for switching the operation mode of the wireless terminal to the slave station mode if the wireless terminal receives said FH control frame from a stationary base station when said station status ID indicates one of the facts that the wireless terminal is in the base station mode and that the wireless terminal in the slave station mode under one of the other mobile wireless terminal operating as a base station.

9. A mobile wireless terminal according to claim 6, further comprising:

means for storing a group ID; and means for periodically transmitting an FH control frame with the group ID added thereto when said mobile wireless terminal is operating in the base station mode;

wherein said control means includes means for checking the relation between the group ID stored in said mobile wireless terminal and a group ID in the FH control frame received from another station and processing the FH control frame as an invalid frame when a predetermined correspondence is lacking between said two group IDs.

10. A mobile wireless terminal according to claim 6, further comprising:

means for storing a frequency hopping pattern; and means for changing the carrier frequency of communication frames and the FH control frame in accordance with said frequency hopping pattern at predetermined intervals of time while said mobile wireless terminal is operating in the base station mode.

11. A mobile wireless terminal according to claim 10, further comprising:

detection means for detecting a sync frequency by checking the receiving status of the communication frame while switching the receiving frequencies successively;

wherein said control means includes means for switching the operation mode of the wireless terminal to slave station mode when the detection means detects the sync frequency of a frame transmitted from one of the other stations at the time of initialization.

12. A mobile wireless terminal according to claim 11, further comprising:

timer means for counting the predetermined period; and means for switching the transmission/receiving frequencies in synchronism with the output from said timer means when the receipt of the FH control frame from one of the other stations is delayed while the mobile wireless terminal is operating in the slave station mode and for effecting resynchronization by said detection means when the receiving delay of the FH control frame exceeds a predetermined time.

13. A mobile wireless terminal according to claim 12, wherein said control means includes means for setting the operation mode of the mobile wireless terminal to the base station mode when said detection means fails to detect the transmission/receiving frequency in synchronism with other stations.

14. A mobile wireless terminal according to claim 6, wherein said storage means stores several types of frequency hopping patterns each assigned an identification code, said mobile wireless terminal further comprising means for periodically transmitting the FH control frame containing the identification code of the hopping pattern used by the mobile wireless terminal while the mobile wireless terminal is operating in the base station mode, and means for specifying a frequency hopping pattern to be used in accordance with the identification code contained in a FH control frame when said FH control frame is received from another station.

15. A wireless communication system, comprising:

at least one stationary base station connected to a network for performing communication by generating a frequency hopping (FH) control frame periodically for controlling the frequency hopping and by switching transmission/ receiving frequencies in accordance with a predetermined hopping pattern; and a plurality of mobile wireless terminals each having a base station mode and a slave station mode, the base station mode being for performing communication by generating an FH control frame periodically and switching the transmission/receiving frequencies in accordance with a predetermined hopping pattern, the slave station mode being for performing communication by switching the transmission/receiving frequencies in accordance with a predetermined hopping pattern in synchronism with a FH control frame generated by another station to be a master station;

wherein each of said stationary base station and said mobile wireless terminals has a group ID, each of said mobile wireless terminals includes detection means for detecting whether there exists at least one other station operating in base station mode or the stationary base station which belongs to the same group indicated by the croup ID within a wireless communication area, and control means for selecting one of the slave station mode and the base station mode as an operation mode of the mobile wireless terminal depending upon a detection result of said detection means.

16. A wireless communication system, comprising:

at least one stationary base station connected to a network for performing communication by generating a frequency hopping (FH) control frame periodically for controlling the frequency hopping and by switching transmission/receiving frequencies in accordance with a predetermined hopping pattern, and a plurality of mobile wireless terminals each having a base station mode and a slave station mode, the base station mode being for performing communication by generating an FH control frame periodically and switching the transmission/receiving frequencies in accordance with a predetermined hopping pattern, the slave station mode being for performing communication by switching the transmission/receiving frequencies in accordance with a predetermined hopping pattern in synchronism with a FH control frame generated by another station to be a master station;

wherein each of said mobile wireless terminals includes detection means for detecting whether there exists at least one other station operating in base station mode within a wireless communication area, and control means for selecting one of the slave station mode and the base station mode as an operation mode of the mobile wireless terminal depending upon a detection result of said detection means, and wherein said detection means includes means for detecting the presence or absence of said station operating in base station mode according to the receipt or non-receipt of an FH control frame from said station.

17. A wireless communication system, comprising:

at least one stationary base station connected to a network for performing communication by generating a frequency hopping (FH) control frame periodically for controlling the frequency hopping and by switching transmission/receiving frequencies in accordance with a predetermined hopping pattern; and a plurality of mobile wireless terminals each having a base station mode and a slave station mode. the base station mode being for performing communication by generating an FH control frame periodically and switching the transmission/receiving frequencies in accordance with a predetermined hopping pattern, the slave station mode being for performing communication by switching the transmission/receiving frequencies in accordance with a predetermined hopping pattern in synchronism with a FH control frame generated by another station to be a master station;

wherein each of said mobile wireless terminals includes detection means for detecting whether there exists at least one other station operating in base station mode within a wireless communication area, and control means for selecting one of the slave station mode and the base station mode as an operation mode of the mobile wireless terminal depending upon a detection result of said detection means, and wherein each hopping interval of the transmission/receiving frequencies is divided into first to fourth periods, said stationary base station and each of said mobile wireless terminals transmitting a communication frame including user information during the first period, said stationary base station and each of said mobile wireless terminals being caused to suppress the transmission of the communication frame during the second period, said stationary base station and the mobile wireless terminals operating in base station mode being caused to transmit the FH control frame during the third period, said stationary base station and each of said mobile wireless terminals being caused to hop frequencies during the fourth period.

18. A wireless communication system, comprising:

at least one stationary base station connected to a network for performing communication by generating a frequency hopping (FH) control frame periodically for controlling the frequency hopping and by switching transmission/ receiving frequencies in accordance with a predetermined hopping pattern; and a plurality of mobile wireless terminals each havina a base station mode and a slave station mode, the base station mode being for performing communication by generating an FH control frame periodically and switching the transmission/receiving frequencies in accordance with a predetermined hopping pattern, the slave station mode being for performing communication by switching the transmission/receiving frequencies in accordance with a predetermined hopping pattern in synchronism with a FH control frame generated by another station to be a master station;

wherein each of said mobile wireless terminals includes detection means for detecting whether there exists at least one other station operating in base station mode within a wireless communication area, and control means for selecting one of the slave station mode and the base station mode as an operation mode of the mobile wireless terminal depending upon a detection result of said detection means, and wherein said stationary base station and said mobile wireless terminals operating in base station mode hop frequencies according to different hopping patterns, and each of said mobile wireless terminals operation in slave station mode switches the hopping pattern according to the source of the FH control frame.

19. A wireless communication system according to claim 18, wherein the hopping pattern used by said stationary base station and the hopping pattern used by said mobile wireless terminals operating in base station mode have different numbers of hops during a unit sequence of hopping frequencies.

20. A wireless communication system, comprising:

at least one stationary base station connected to a network for performing communication by generating a frequency hopping (FH) control frame periodically for controlling the frequency hopping and by switching transmission/receiving frequencies in accordance with a predetermined hopping pattern; and a plurality of mobile wireless terminals each having a base station mode and a slave station mode, the base station mode being for Performing communication by generating an FH control frame periodically and switching the transmission/receiving frequencies in accordance with a predetermined hopping pattern, the slave station mode being for performing communication by switching the transmission/receiving frequencies in accordance with a predetermined hopping pattern in synchronism with a FH control frame generated by another station to be a master station;

wherein each of said mobile wireless terminals includes detection means for detecting whether there exists at least one other station operating in base station mode within a wireless communication area, and control means for selecting one of the slave station mode and the base station mode as an operation mode of the mobile wireless terminal depending upon a detection result of said detection means, and wherein said stationary base station and said mobile wireless terminals operating in base station mode hop frequencies at different hopping intervals from each other, and each of said mobile wireless terminals operating in slave station mode hops frequencies at a hopping interval determined by said source of the FH control frame.

21. A wireless terminal for communicating with other wireless equipments while hopping the carrier frequency periodically, comprising:

first monitor means for monitoring the receipt of an FH control frame for hopping carrier frequencies of a plurality of wireless equipment in synchronism with each other during a first period, said first monitor means causing the wireless terminal to operate in slave mode when the FH control frame is received during said first period; and second monitor means for monitoring the receipt of a FH control frame and a notice frame from one of the other wireless equipment notifying that said one wireless equipment stands for a master station, during a second period following the first period when the FH control frame is not received from any other wireless equipment during the first period;

wherein said second monitor means causes said wireless equipment to operate in slave station mode when the FH control frame is received during the second period, to switch to a monitoring operation by said first monitor means when the FH control frame is not received by a notice frame during the second period, and to transmit a notice frame to other wireless equipments notifying that the wireless equipment stands for a master station when neither the FH control frame nor the notice frame is receive during a submonitor period shorter than the second period, to thereby operate the wireless equipment in master station mode after the lapse of the second period.

22. A wireless terminal according to claim 21, further comprising:

means for starting the monitoring operation of said first monitor means upon detection of one of the facts that said wireless terminal is powered on and that the FH control frame fails to be received a successive predetermined number of times from a master station.

23. A wireless terminal according to claim 1, wherein said second monitor means repeatedly cause the wireless terminal to transmit a notice frame after each lapse of the submonitor time during the second period.

24. A wireless terminal according to claim 23, wherein said second monitor means has a time unique to said wireless terminal as said submonitor time.

25. A wireless terminal for communicating with other wireless equipment while hopping the carrier frequencies periodically, comprising:

first monitor means for monitoring the receipt of a frequency hopping (FH) control frame for hopping carrier frequencies of a plurality of wireless equipment in synchronism with each other and a notice frame for notifying that one of said wireless equipments stands for a master station, said first monitor means causing the wireless terminal to operate in slave station mode when the FH control frame is received during a first period; and second monitor means for monitoring the receipt of a FH control frame from any one of the other wireless equipment and a notice frame from any one of the other wireless equipment during a second period following the first period, when the FH control frame is not received during the first period;

wherein said second monitor means causes the wireless terminal to operate in slave station mode when the FH control frame is not received during the second period, to switch to a monitoring operation by the first monitor means when the FH control frame is not received by a notice frame during the second period, and to transmit a notice frame to other wireless equipment to notify that the wireless terminal stands for a master station when neither the FH control frame nor the notice frame is received during a submonitor time shorter than the second period, to thereby operate the wireless terminal in master station mode after the lapse of the second period.

26. A wireless terminal according to claim 25, further comprising:

means for detecting one of the facts that the wireless terminal is powered on and that a FH control frame is received a predetermined number of times successively from a master station, and starting the monitoring operation by the first monitor means.

27. A wireless communication system, comprising:

a plurality of wireless equipment having two operation modes including a base station mode for generating a frequency hopping (FH) control frame periodically for synchronizing the hopping operations of transmission/ receiving frequencies and a slave station mode for performing the frequency hopping operations in synchronism with a FH control frame generated by one of the other stations;

each of said wireless equipments including:

a first monitor means for monitoring during a first period the receipt of a FH control frame for hopping carrier frequencies of a plurality of wireless equipment in synchronism with each other and a notice frame notifying that one of said wireless equipments stands for a master station, said first monitor means causing the wireless equipment to operate in slave station mode when an FH control frame is received during the first period, second monitor means for monitoring the receipt of a FH control frame from any one of the other wireless equipment and a notice frame from any one of the other wireless equipment during a second period following the first period, when the FH control frame is not received during the first period, said second monitor means causing the wireless equipment to operate in slave station mode when the FH control frame is received during the second period, to switch to a monitoring operation by the first monitor means when the FH control frame is not received by the notice frame during the second period, and to transmit a notice frame to their other wireless equipment when neither the FH control frame nor the notice frame is received during a submonitor period shorter than the second period, and it transmits the FH control frame by causing the wireless equipment to operate in base station mode after the lapse of the second period;

means for storing status information indicating a relation between the wireless equipment and a base station; and control means for selecting one of said two operation modes in accordance with the relation between the station information of the wireless equipment and status information of a source station of a FH control frame upon receipt of the FH control frame from one of the other station, whereby the operation mode of one of two wireless equipment both operating in base station mode is switched to slave station mode when said wireless equipment approach each other within a communication range.

* * * * *